United States Patent [19]
Hieronymus

[11] Patent Number: 5,924,592
[45] Date of Patent: Jul. 20, 1999

[54] UNITABLE UTENSILS AND CONTAINER HANDLES

[76] Inventor: John R. Hieronymus, 4234 Industrial Pl., Island Park, N.Y. 11558

[21] Appl. No.: 08/582,451

[22] Filed: Jan. 3, 1996

Related U.S. Application Data

[63] Continuation-in-part of application No. 08/480,091, Jun. 7, 1995, abandoned, which is a continuation-in-part of application No. 08/373,912, Jan. 17, 1995, abandoned, which is a continuation of application No. 08/994,505, Dec. 21, 1992, abandoned.

[51] Int. Cl.⁶ .................................................. B65D 8/12
[52] U.S. Cl. ....................... 220/574.1; 220/735; 220/756
[58] Field of Search .................................. 220/574.1, 735, 220/756

[56] References Cited

U.S. PATENT DOCUMENTS 1,554,887  9/1925  Smith ........................................ 220/756

FOREIGN PATENT DOCUMENTS

| | | | |
|---|---|---|---|
| 662503 | 5/1963 | Canada ................................ | 220/574.1 |
| 2412147 | 9/1975 | Germany ............................. | 220/574.1 |
| 0002043 | 1/1911 | United Kingdom ................. | 220/574.1 |
| 0266239 | 2/1927 | United Kingdom ................. | 220/574.1 |
| 269328 | 4/1927 | United Kingdom ................. | 220/574.1 |

*Primary Examiner*—Joseph M. Moy

[57] ABSTRACT

A container handle having an upper surface shaped to receive and unite firmly with a utensil handle having an oppositely shaped lower surface which immobilizes lateral surface movement in any direction and holds suspended a utensil work member over a pan while offering no resistance to lift-off separation. With container and utensil handles united, a sealed utensil shank entrance groove within a lid, or container handle rim and sidewall, is provided to dispose a utensil work member within the container below a lid and spaced apart from and above food therein. To fill the utensil shank entrance enclosure when a lid is installed on a container without a utensil in place, a mechanical or automatic groove filler is installed in the container handle which fills the groove to provide a uniformly sealed lid on the container. The utensil and container handle sidewalls are beveled inwardly towards the surface contact portions of the handles to facilitate gripping and lift-off separation of the utensil handle from the container handle.

6 Claims, 7 Drawing Sheets

UNITABLE UTENSILS AND CONTAINER HANDLES

The instant application is a continuation-in-part of application Ser. No. 08/480,091 (filed Jun. 7, 1995) which is a continuation-in-part of application Ser. No. 08/373,912 (filed Jan. 17, 1995) which is a continuation of application Ser. No. 07/994,505 (filed Dec. 21, 1992), now all abandoned.

BACKGROUND OF THE INVENTION

1. Field of the Invention

The present invention is directed generally to (1) a utensil having a handle, the lower surface of which is shaped to interconnect gravitationally and structurally with the upper surface of a container handle of opposite shape, to stably locate the utensil without restricting manual separation of the handles, (2) an entrance for the utensil into a container which maintains suitable confinement of container contents with or without a utensil therein, and (3) a utensil extending horizontally across a container rim stably supported by a shank portion shaped to straddle a portion of the container rim and sidewall.

2. Description of the Related Art

Cookware such as pots, saucepans, skillets and frying pans are typically sold as complete matching sets. Similarly, kitchen utensils such as ladles, spoons, spatulas, and forks are often sold in sets which differ, however, from such cookware. Yet, in the preparation and cooking of various foods, often both items of cookware and kitchen utensils are used in conjunction with one another. For example, a cook preparing foods on a stove top generally uses a pot and a ladle simultaneously. Whereas, in frying foods, a cook will often simultaneously use a frying pan and a spatula.

Problems encountered in repetitively using kitchen utensils in preparing food include placing the utensil on a counter top which may be unsanitary or become soiled with food or grease from the utensil. Additionally, an appreciable amount of time is spent searching for the kitchen utensil each time the kitchen utensil is to be repetitively used.

A number of attempts have been made at adapting kitchen utensils to cookware. For example, U.S. Pat. No. 1,836,014 to Chamberlain is directed to a ladle having an adjustable hook member slidably mounted on the handle portion for supporting the ladle on the rim of the kettle. Likewise, U.S. Pat. No. 1,106,809 to Haverty and Eckenrod is directed to a kitchen utensil having a handle with an inverted U-shaped hook adaptable to accept a body portion such as a ladle and also support the kitchen utensil on the rim of a kettle.

Another example, U.S. Pat. No. 2,676,830 to Lawson is directed to a kitchen utensil which attaches to the rim of a pan by a clip having a pair of inverted U-shaped members. The kitchen utensil is supported on the rim parallel to the handle of the pan.

Still another example, U.S. Pat. No. 2,551,877 to Ditto is directed to a food turner having a flat blade with a wall at the rear of the blade having an aperture and baffle for turning hamburgers and eggs. The baffle may look like a hook so that the device may be supported on the edge of a pot or other utensil.

These devices, however, are incapable of maintaining proper position of a lid or cover on the pot while the utensil is supported on the rim. Moreover, these devices suffer from an increased likelihood of accidental contact with the kitchen utensil handle which extends vertically upward or horizontally outward from the pot.

Other related patents also disclose arrangements which suffer from various disadvantages. For example, U.S. Pat. No. 769,119 to Strickland, U.S. Pat. No. 2,314,755 to Ballarino, U.S. Pat. No. 5,105,963 to Scott and Swiss Patent Document No. 323,557 all show arrangements in which a handle of a utensil is locked or attached to a handle of a frying pan or pot. However, such arrangements (1) unnecessarily inhibit removal of the utensil from the pan/pot and (2) unnecessarily complicate engagement of the utensil with the pan/pot.

In addition, the arrangement disclosed in U.S. Pat. No. 3,406,861, also suffer from disadvantages. If used for a cooking container, removal and installation of the utensil would be too hot to manually handle. Furthermore, the utensil notch used in that arrangement diminishes the container rim height.

The arrangement disclosed in U.S. Pat. No. 1,079,942, if used as cookware, would be unnecessarily complicated for use. In particular, the utensil of that arrangement extends vertically through the lid notch. As such, hot air or steam rising from the container and through the utensil notch would heat the area above container. In addition, removal of the utensil is required every time the lid is lifted to inspect container contents. Such disadvantages render that arrangement and other such arrangements unsuitable for use.

SUMMARY OF THE INVENTION

Accordingly, it is an object of the present invention to provide an improved assembly having utensil and container handles which have opposite surfaces which unite firmly without restricting manual separation between the handles.

It is also an object of the present invention to provide a utensil and container handle assembly in which the utensil is conveniently supported, releasably immobilized in its supported position, and easily accessible for repeated use during cooking.

It is also an object of the present invention to provide such a container assembly in which a lid or cover can be properly positioned on the rim of a container while the kitchen utensil is supported on the container handle.

It is a further object of the present invention to provide such a container assembly in which a kitchen utensil is united with the container handle wherein the work engaging member of the kitchen utensil is supported above and spaced apart from the open end of the container so that grease or drippings are contained in the container.

It is another object of the present invention to provide such a container assembly in which a kitchen utensil is conveniently supported and releasably united with the container handle enabling convenient storage of the container and kitchen utensil when not in use.

It is still another object of the present invention to provide such a container assembly which is inexpensively and easily manufactured for use by the cooking population at large.

It is another object of the present invention to provide groove filler arrangements to fill a groove in the container, through which a utensil may be disposed, so that upon removal of the utensil, the groove is filled to maintain content confinement within the container.

In accordance with the present invention, the invention is directed generally to a utensil and container arrangement, including a utensil, a utensil handle connected to the utensil, a container, a container handle connected to the container, wherein the utensil handle and the container handle have opposite surfaces which firmly unite to restrict lateral surface movement without restricting lift-off separation of the utensil handle from the container handle.

BRIEF DESCRIPTION OF THE DRAWINGS

Other objects and features of the patent invention will become apparent from the detailed description considered in connection with the accompanying drawings, which disclose several embodiments of the invention. It is to be understood that the drawings are to be used for the purpose of illustration only and not as a definition of the limits of the invention.

In the drawings, wherein similar reference characters denote similar elements throughout the several views.

DETAILED DESCRIPTION OF THE PREFERRED EMBODIMENTS

Figure 1:
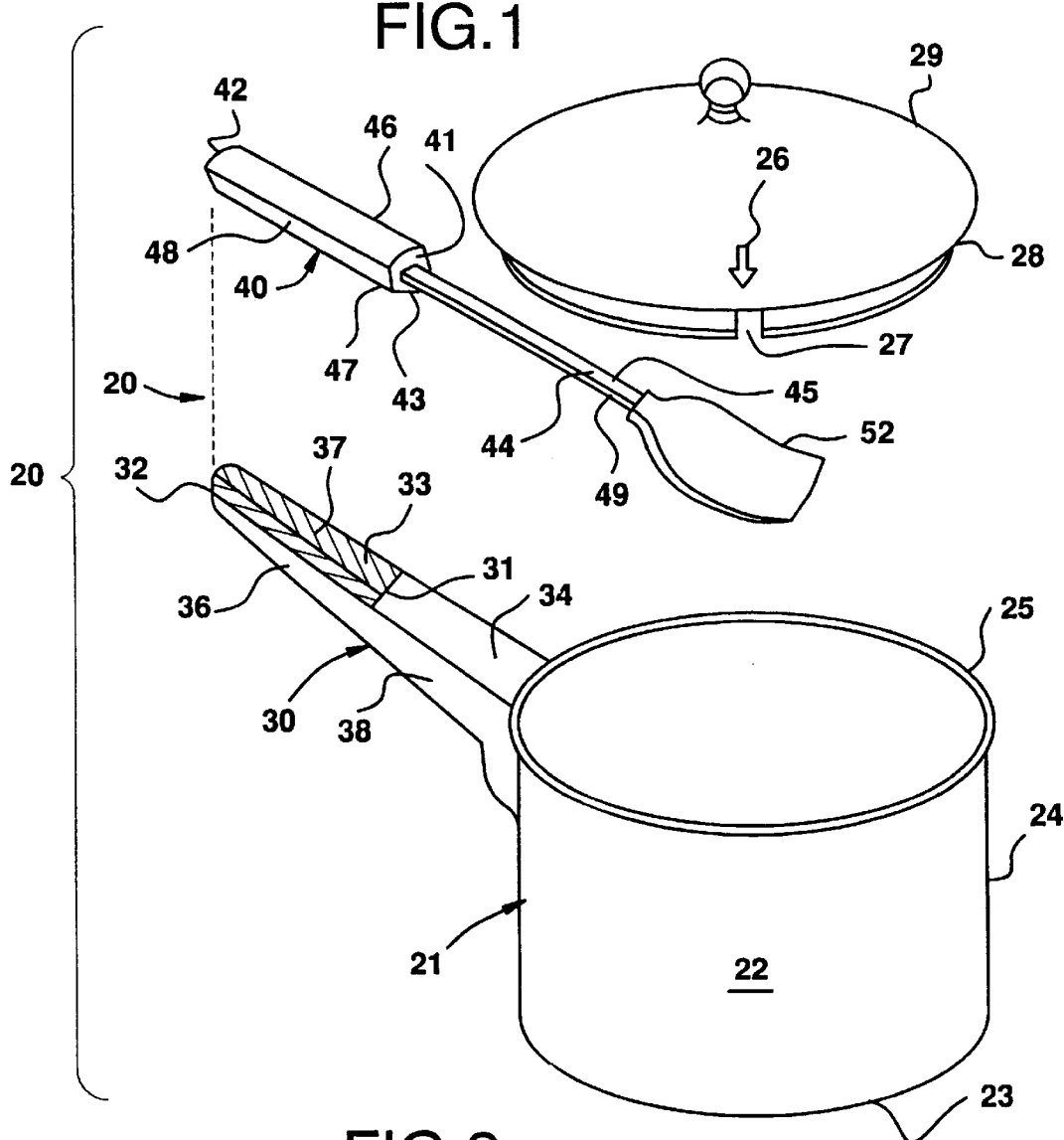
FIG. 1 is an exploded perspective view of the container assembly embodying the present invention.
Figure 2:
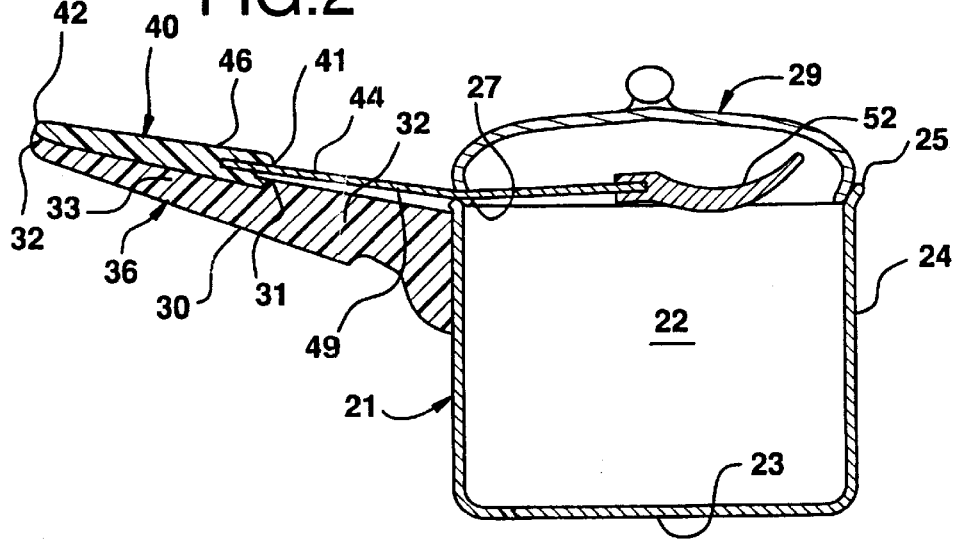
FIG. 2 is a sectional side view through the container and utensil along the center of their respective handles.

Turning now in detail to the drawings, and in particular to FIGS. 1 and 2, therein illustrated is a container assembly 20 embodying the present invention which generally includes (1) a container and handle assembly 21 having a container handle 30, (2) a kitchen utensil assembly 40 which is to be supported and united with handle 30, and (3) a cover or lid 29.

With continuing reference to FIG. 1, container and handle assembly 21 has a container 22 for containing food while preparing and cooking on a stove top. Specifically, container 22 has a circular bottom 23, side wall 24 and a rim 25 defining an open end. Lid 29 has a shank entrance groove locator indicator 26 (preferably an arrow) and a shank entrance and enclosure groove 27 in lid rim 28.

The container 22 has a handle 36 which is attached to sidewall 24 by screws, rivets, spot welding or other suitable means. The handle 36 has a V-shaped groove 33 with an inner abutting end 31 and an outer abutting end 32 which form a receiver pocket 37 within upper surface 34 of the handle 36. Handle 36 also has a sidewall 38.

The utensil assembly 40 includes a utensil handle 46 having a downward V-shaped bottom surface 43 with an obtusely angled inner abutting end 41 and an acutely angled outer abutting end 42 that form a handle insert 47 having a complementary shape opposite pocket 37 of handle 36.

With reference to FIG. 2, the handles 36, 46 are shown after they have been united. In this regard, when utensil handle 46 is placed on top of container handle 36, insert 47 unites firmly with pocket 37 thereby partially immobilizing the handles 36, 46 with respect to one another by preventing lateral surface movement between the handles 36, 46. This arrangement, however, does not restrict vertical removal of utensil handle 46 from container handle 36, thereby facilitating rapid removal of utensil handle 46 from container handle 36.

With continuing reference to FIGS. 1 and 2, utensil assembly 40 has a shank 44 which connects handle 46 to work member 52. Utensil assembly 40 also has shank sides and upper surface 45, a handle sidewall 48 and a shank lower surface 49. With handles 36, 46 united, the bottom surface 49 of shank 44 rests on and crosses over a portion of rim 25 disposed beneath enclosure groove 27. While this bottom surface 49 rests on and crosses over this portion of rim 25, work member 52 is disposed within container 22 below and spaced apart from installed lid 29. With lid 29 installed atop container 22, lid rim 28 contacts container rim 25 and the shank entrance and enclosure groove 27 fits and encloses the upper and side surface 45 of the shank 44. In addition, rim 25 and groove 27 surround and enclose shank bottom 49 and top surface 45 to form a sealed shank entrance which is comparable to the seal between lid rim 28 and container rim 25.

Figure 3:
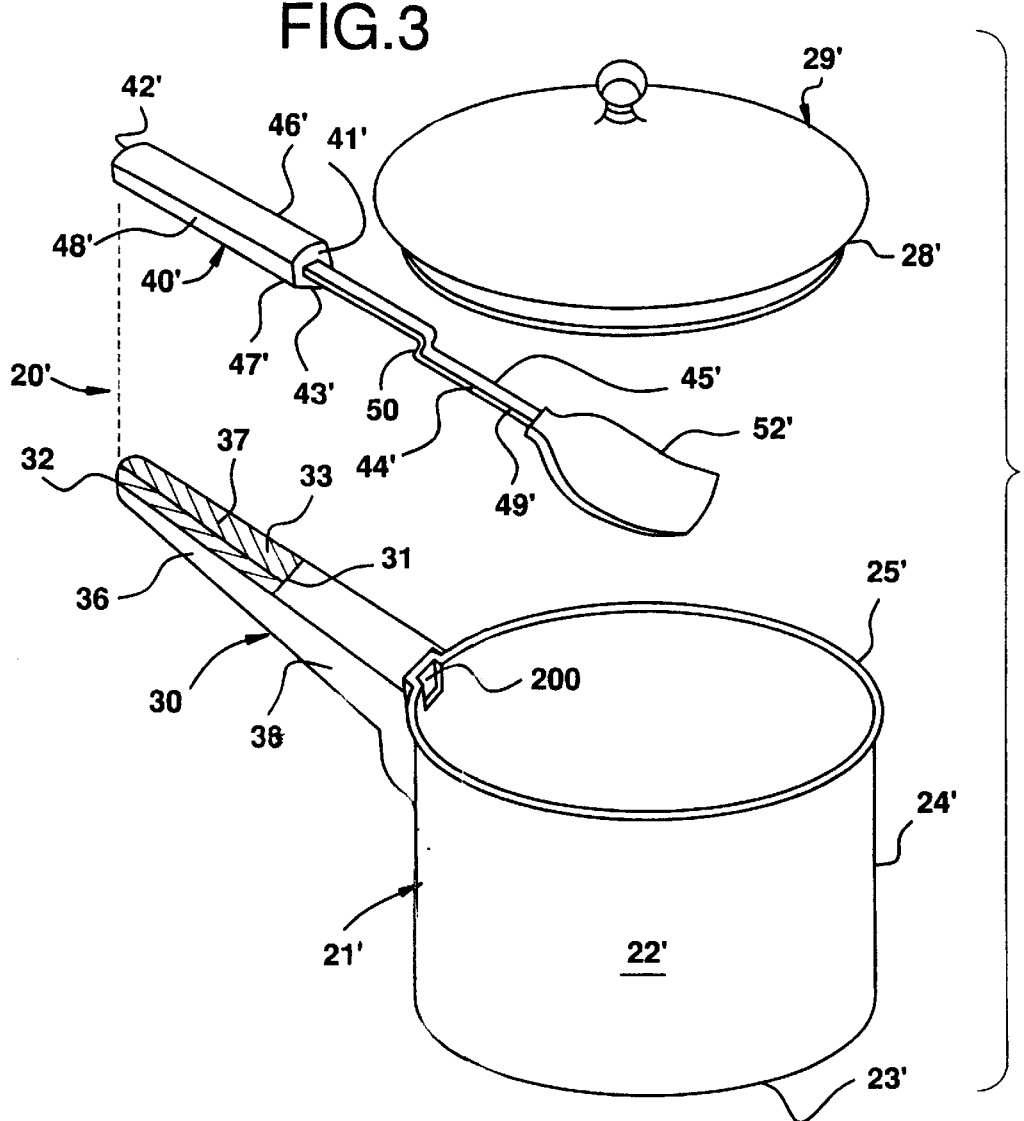
FIG. 3 is a perspective view of an alternative embodiment of the handles of the kitchen utensil and the container of the present invention.
Figure 4:
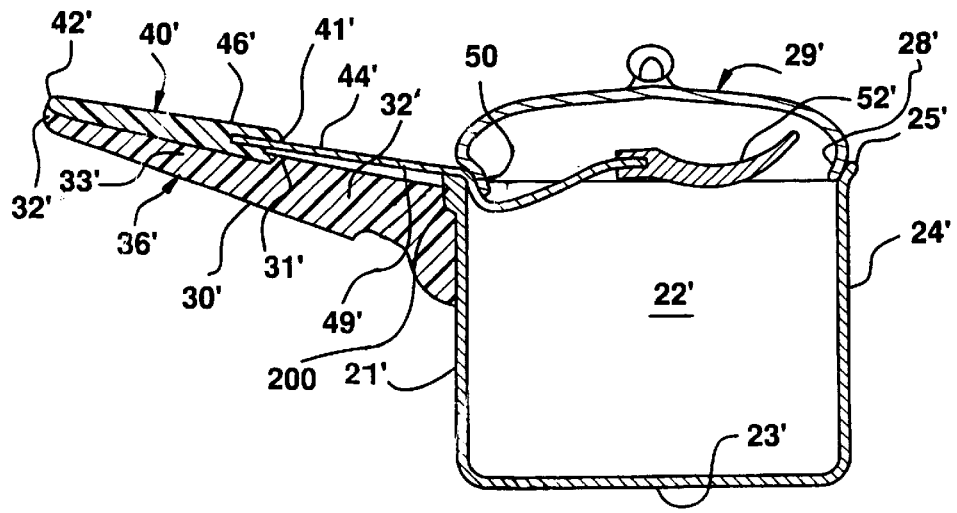
FIG. 4 is a perspective view of the alternative embodiment of the handles of the kitchen utensil and the container shown in FIG. 3.
Figure 4A:
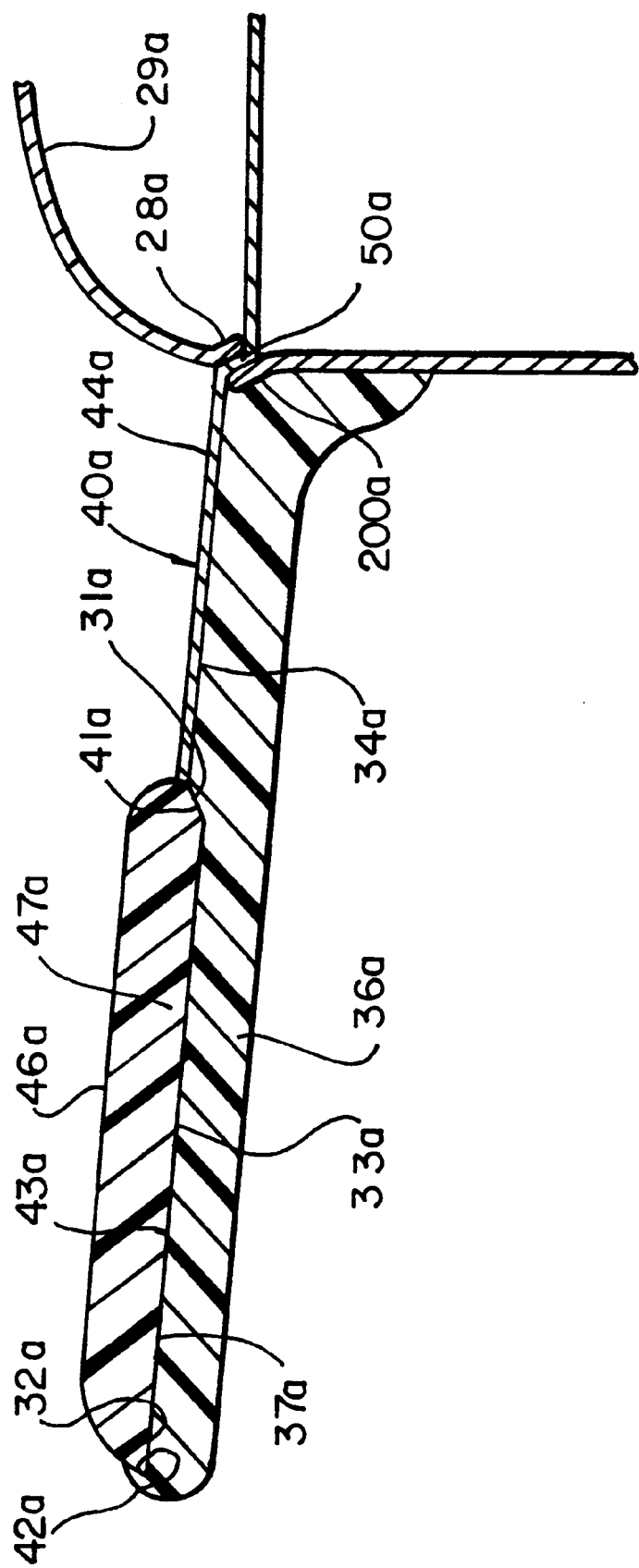
FIG. 4a is a perspective view of an alternate embodiment of the handles of the kitchen utensil and container shown in FIG. 3.

With reference to FIG. 3 and 4, an alternative embodiment of the present invention is shown. In these Figures, elements common to the first embodiment shown in FIGS. 1 and 2 retain their original reference numerals with the addition of a prime insignia ('). In general, this second embodiment of FIGS. 3 and 4 differs from the first embodiment of FIGS. 1 and 2 only with respect to shank portion 50, the shank enclosure entrance 200 and the lack of an enclosure groove (such as groove 27 in FIG. 1). In particular, shank 44' has a shank portion 50 and a bottom and side surface 49' which fits into an outdented shank entrance and enclosure groove 200 which is shaped into rim 25' and sidewall 24' of container 22'. Shank portion 50 and upper surface 45' coincide with and hold the surface shape of rim 25' and sidewall 24' into which shank portion 50 is placed when handles 36' and 46' are united (as in FIG. 4). Upon placement of lid 29' on container 22' while the handles 36', 46' are united, rim 28' of lid 29' comes in contact with shank portion 50 and upper surface 45' thereby enclosing the shank portion 50 between the rim 28' and outdented shank entrance 200. The outdented shank entrance 200 maintains the height of container rim 25'. With reference to FIG. 4a, groove 33a is shown with an obtusely angled abutting inner end 31a and an acutely angled abutting outer end 32a which form a receiver pocket 37a within upper surface 34a of handle 36a.

The utensil assembly 40a includes a utensil handle 46a having a downward V-shaped bottom surface 43a with an obtusely angled abutting inner end 41a and an acutely angled abutting outer end 42a that form a handle insert 47a having a complementary shape opposite pocket 37a of handle 36a which, when united, are firmly gravitationally and structurally interlocked.

FIG. 4a handles 46a and 36a are interlocked abutting ends 31a and 41a restrict spatula handle 46a inward movement, and maintain contact of abutting ends 32a and 42a without resisting manual lift off separation of said ends 31a and 41a. Acutely angled abutting ends 32a and 42a are structurally interlocked availing stable independent suspended support of a utensil shank and work member when required for other species. Angular manual lift off separation of handle 46a from handle 36a is not restricted, thereby facilitating rapid removal of utensil handle 46a from the container.

Figure 5A:
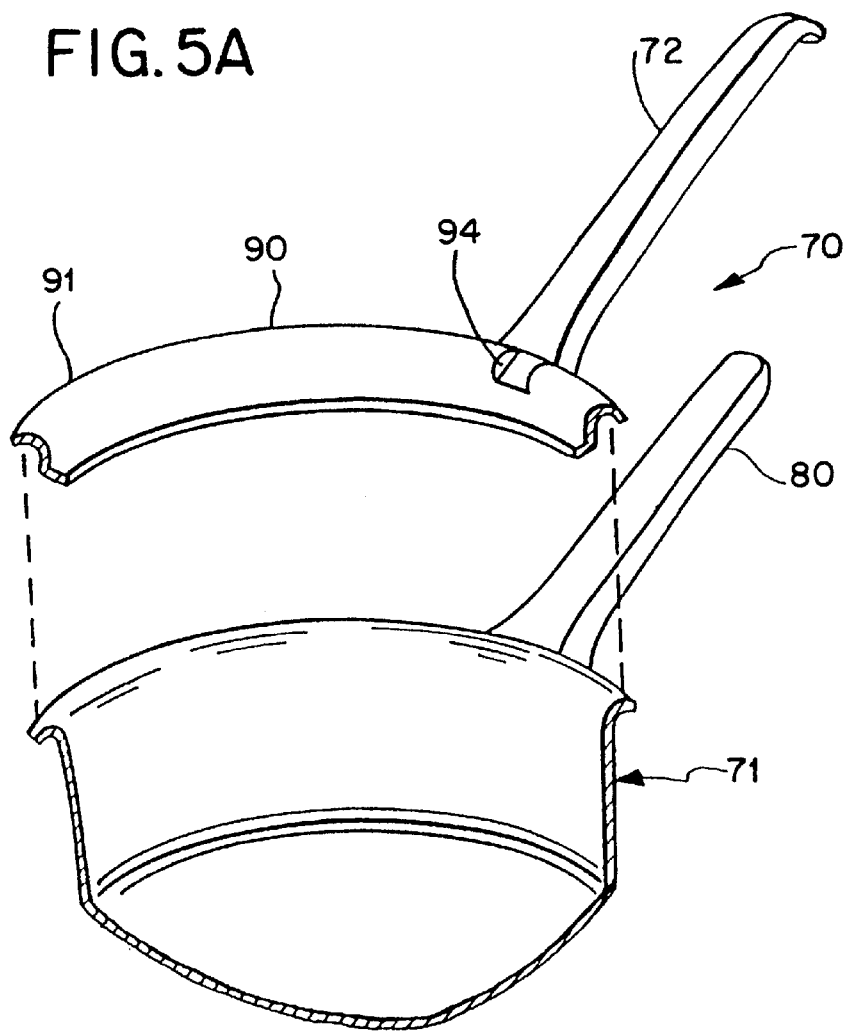
FIG. 5a is an exploded perspective view of still another alternative embodiment of the present invention including an adaptable ring upon which the kitchen utensil handle rests.
Figure 5B:
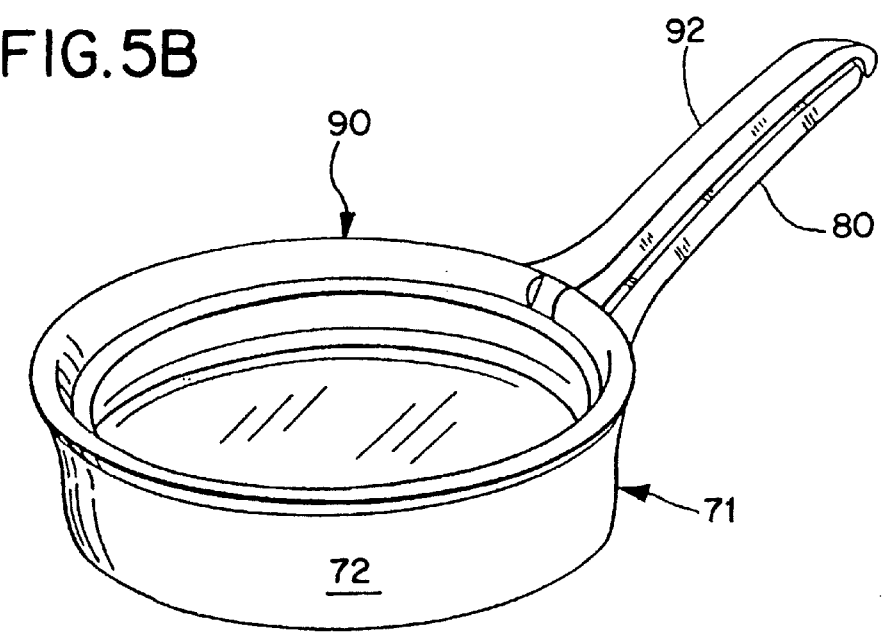
FIG. 5b is a perspective view of the embodiment of the present invention shown in FIG. 5a in which the ring is seated on a cooking container.
Figure 6:
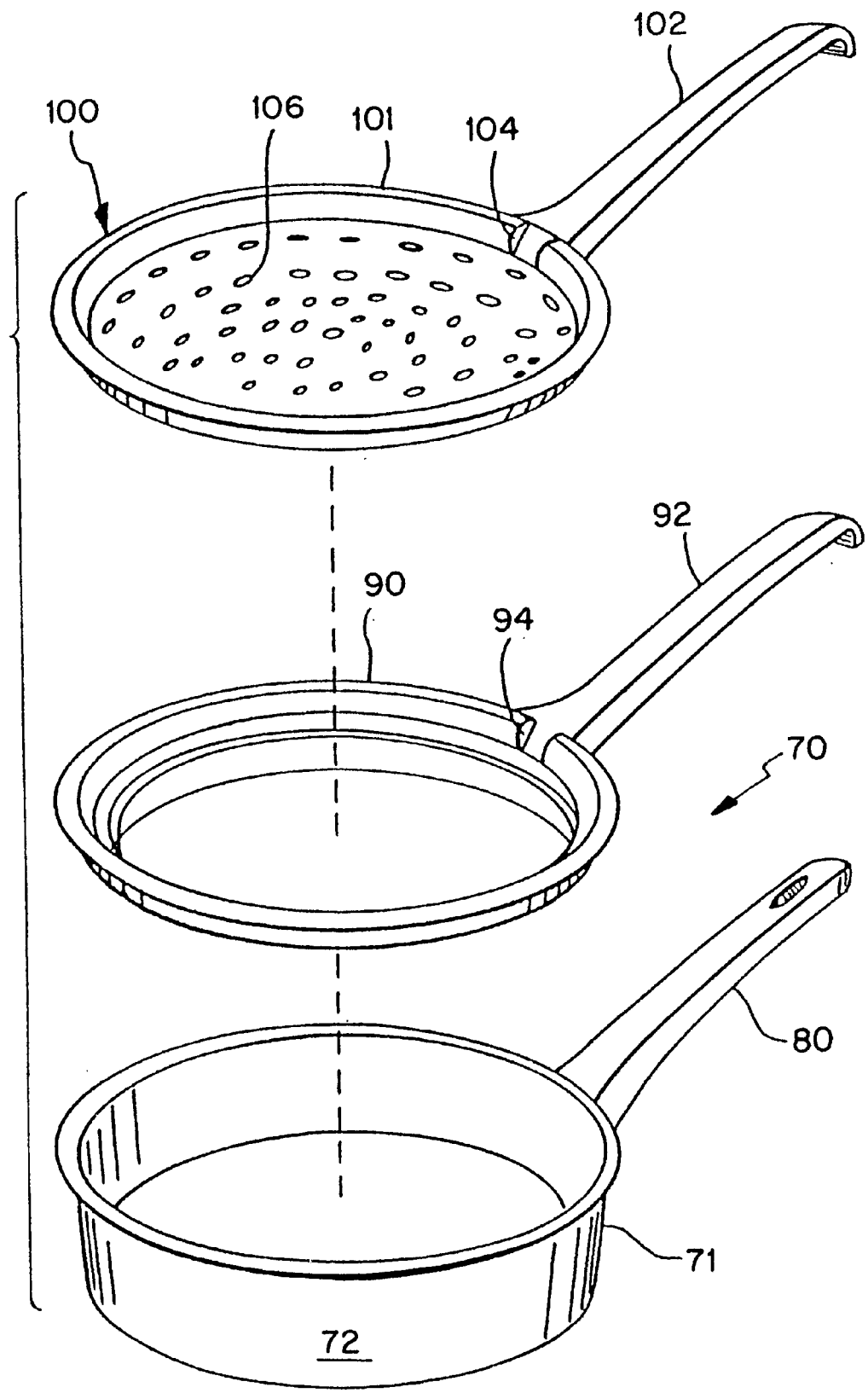
FIG. 6 is an exploded perspective view of yet another alternative embodiment of the present invention including a second adaptable ring having a strainer.

With reference to FIGS. 5a and 5b, another embodiment of the invention is shown. In particular, assembly 70 includes a container 71, a ring adapter 90, a kitchen utensil (not shown) and a lid (not shown). Ring adapter 90 has a ring 91, a handle 92 and a recessed groove 94 in ring 91 for passage of the kitchen utensil. The ring adapter 90 permits the use of a conventional pot or pan without requiring it to be modified to provide a groove for the shank of the kitchen utensil. Additionally, as shown in FIG. 6, a second ring adapter 100 having rim 101, handle 102, groove 104 and a central strainer section 106 can be placed on top of the first adapter ring 90. In fact, multiple ring adapters having strainer sections or other configured centers could be used for a multi-pot attached arrangement for steaming or cooking different foods at the same time.

Throughout the embodiments disclosed in FIGS. 1–4, the container handles and utensil handles are beveled at the point of contact to (1) allow the container handle and utensil handle to unite and (2) facilitate griping of said utensil handle during lift-off separation of said utensil handle from the container handle.

Figure 7:
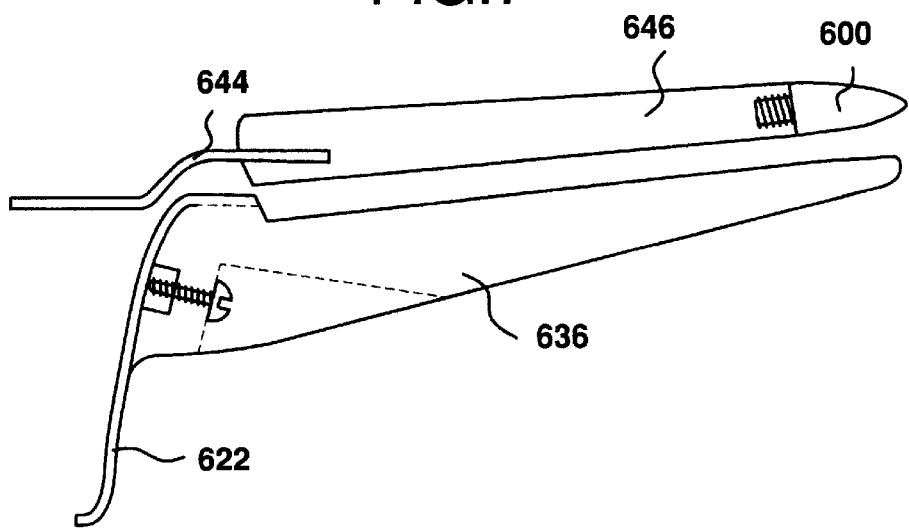
FIG. 7 is a side view of a utensil handle as it unites with a grooved handle and container in accordance with an embodiment of the present invention.
Figure 8:
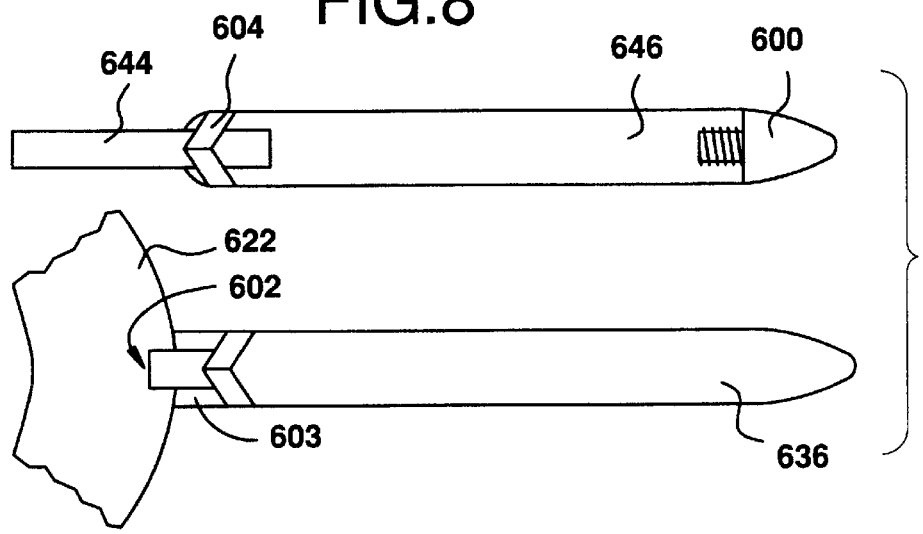
FIG. 8 this an exploded view of the utensil handle and pot handle of FIG. 7.
Figure 9:
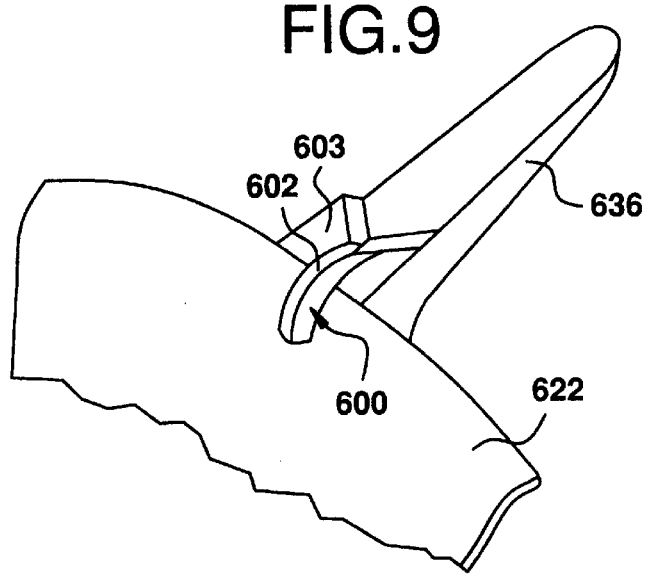
FIG. 9 is a perspective view of the grooved pot and grooved pot handle of FIGS. 7 and 8.

As shown in FIGS. 7–9, another form of utensil handle 646 may be used with an end weight 600 to hold the handle down so as to counteract the weight of the utensil itself (i.e. a spoon or spatula). With continuing reference to FIGS. 12–14, container handle 636 may have a raised angled surface 603 which interacts with angled surface 604 of utensil handle 646 to unite the container handle 636 with the utensil handle 646. Container 622 also has a groove 600 for receiving a shank 644 connected to utensil handle 646. Utensil handle 646 has a groove 602 which is shaped to receive shank 644. Once the shaft 644 is placed within grooves 600, 602, the shank 644 fills the groove 600 so that it has the same shape of container 622, thereby allowing a top to be installed on container 622. As with the embodiment of FIGS. 10–11, the upper surface of the container handle may have a point of contact equal to the height of the edge of the container to form a shank enclosure entrance under an installed lid.

Figure 10:
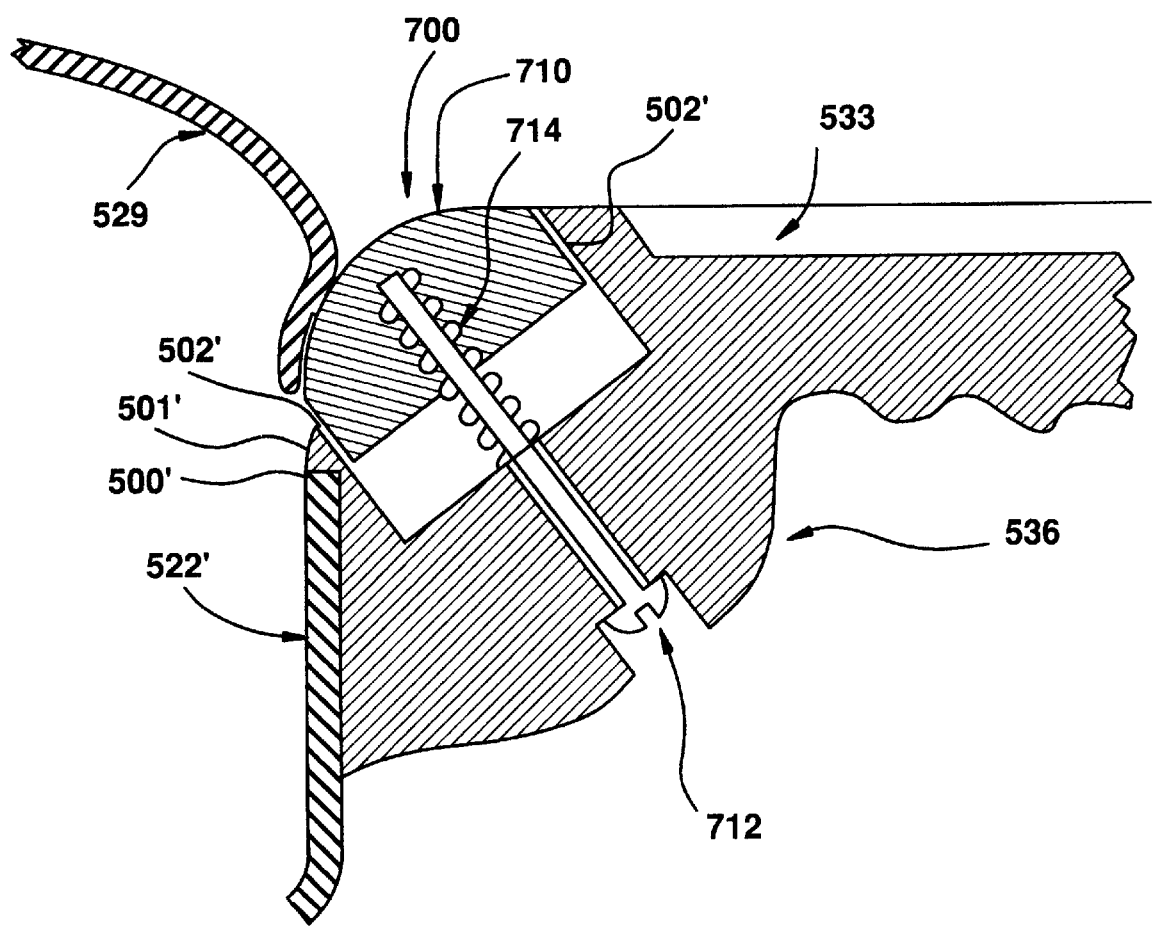
FIG. 10 is a side view of an automatic groove filler in its extended position.

With reference to FIG. 10, an automatic groove filler 700 of the present invention is shown. As depicted, the automatic groove filler 700 is shown in conjunction with the handle arrangement of FIG. 8, although it is to be understood that such a groove filler may be used with the handle arrangement of FIGS. 7–9. Automatic groove filler 700 includes a groove filler 710 which is connected to container handle 536 via retaining screw 712. A spring 714 disposed around retaining screw 712 exerts a force on groove filler 710 to push groove filler 710 in its extended position as shown in FIG. 10. As seen in this Figure, in its extended position, groove filler 710 fills groove 502 in order to seal the container 522 when cooking without a utensil installed, thereby preventing steam and any contents within the container 522 from escaping through the groove under an installed lid.

The container described throughout this application, while preferably formed from stainless steel or aluminum with an inner non-stick coating such as the type sold under the trademark TEFLON, can be made from a wide variety of materials and can be made in various sizes and configurations. The handles are also preferably made from an insulating material, such as wood or molded plastic, permitting a cook or chef to grip and lift the cooking pot assembly onto and off the stove. The work engaging member is preferably formed from plastic, ceramics or metal such as stainless steel.

Thus, while only several embodiments of the present invention have been shown and described, it is to be understood that many changes and modification may be made thereunto without departing from the spirit and scope of the invention.

What is claimed is:

1. A cooking container having a side wall bounding a cooking area, a handle connected to extend outwardly from said side wall, said handle having an upper surface characterized by an open V-shaped pocket, a cooperating cooking utensil having an operative position in supported relation on said handle and an inner end extended into said cooking area, said cooking utensil having a bottom characterized by a depending V-shaped surface adapted to interfit within said V-shaped pocket, and a cover disposed in covering relation over said cooking area, whereby said container handle and cooking utensil in interfitting relation serve as a handle for moving said cooking container and said cooking utensil is otherwise separately removable for other uses.

2. The arrangement of claim 1 wherein the container handle provides a utensil shank entrance groove and an automatic groove filler which maintains the container rim height and container content confinement in the presence or absence of a utensil.

3. The arrangement of claim 1 wherein the container handle comprises a manual groove filler.

4. The arrangement of claim 1 wherein the container lid contains a groove which encloses the utensil shank extending horizontally across the container rim.

5. The arrangement of claim 4 where the container lid includes a lid groove location indicator.

6. The arrangement of claim 1 further comprising a manual groove filler which fills a lid groove in the absence of a utensil.

* * * * *